(12) United States Patent
Cameno Salinas et al.

(10) Patent No.: US 10,272,690 B2
(45) Date of Patent: Apr. 30, 2019

(54) SELECTION VALVES OF FLUID SUPPLY SYSTEMS

(71) Applicant: HEWLETT-PACKARD DEVELOPMENT COMPANY, L.P., Houston, TX (US)

(72) Inventors: Alfonso Cameno Salinas, Barcelona (ES); Francesc Ros Cerro, Sant Vicent de Montalt (ES); Vicente Granados Asensio, Sant Cugat del Valles (ES); Oriol Parera Fiestas, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/542,431

(22) PCT Filed: Jan. 30, 2015

(86) PCT No.: PCT/US2015/013785
§ 371 (c)(1),
(2) Date: Jul. 9, 2017

(87) PCT Pub. No.: WO2016/122599
PCT Pub. Date: Aug. 4, 2016

(65) Prior Publication Data
US 2017/0361621 A1    Dec. 21, 2017

(51) Int. Cl.
*B41J 2/175*    (2006.01)
*F16K 11/072*    (2006.01)
(Continued)

(52) U.S. Cl.
CPC ........... *B41J 2/17596* (2013.01); *B41J 2/175* (2013.01); *B41J 29/38* (2013.01); *F16K 11/072* (2013.01);
(Continued)

(58) Field of Classification Search
CPC .... B41J 2/175; B41J 2/17596; B41J 2/17556; F16K 27/065; F16K 31/445
See application file for complete search history.

(56) References Cited

U.S. PATENT DOCUMENTS 4,561,516 A    12/1985    Bishop et al.
4,988,077 A *    1/1991    Conley ................... F16K 5/045
                                                  251/309
(Continued)

FOREIGN PATENT DOCUMENTS

CN    1473708    2/2004
CN    1799846    7/2006
(Continued)

*Primary Examiner* — John Zimmermann
(74) *Attorney, Agent, or Firm* — HP Inc. Patent Department (57) ABSTRACT

In an example, a selection valve of a fluid supply system is disclosed. The selection valve selectively couples a source of pressurized air to one of first and second fluid supply cartridges, in the fluid supply system, to provide fluid to a printhead, the one of first and second fluid supply cartridges being coupled to the source of pressurized air at a time and other fluid supply cartridge being vented to the atmosphere. The selection valve includes a sleeve to provide interconnections with the source of pressurized air, the first and second fluid supply cartridges, and the atmosphere. Further, the selection valve includes a core disposed rotatably inside the sleeve to selectively couple the one of first and second fluid supply cartridges to the source of pressurized air and the other fluid supply cartridge to the atmosphere for switching the pressurized air between the first and second fluid supply cartridges.

20 Claims, 7 Drawing Sheets

(51) Int. Cl.
*F16K 31/04* (2006.01)
*F16K 37/00* (2006.01)
*B41J 29/38* (2006.01)

(52) U.S. Cl.
CPC ........ *F16K 31/043* (2013.01); *F16K 37/0041* (2013.01)

(56) References Cited

U.S. PATENT DOCUMENTS

| | | | |
|---|---|---|---|
| 5,519,474 A | 5/1996 | Arcaro et al. | |
| 5,659,347 A | 8/1997 | Taylor | |
| 5,829,336 A * | 11/1998 | Schulze | F15B 9/12 91/365 |
| 6,206,511 B1 | 3/2001 | Cook et al. | |
| 6,447,109 B1 * | 9/2002 | Williamson | B41J 2/17506 347/85 |
| 7,048,363 B2 | 5/2006 | Kobayashi et al. | |
| 7,192,110 B2 | 3/2007 | Taguchi et al. | |
| 7,401,907 B2 | 7/2008 | Perez | |
| 8,113,612 B2 * | 2/2012 | Levy | B41J 2/175 347/19 |
| 8,210,665 B2 | 7/2012 | Herman | |
| 8,591,016 B2 | 11/2013 | Leighton et al. | |
| 9,139,012 B2 * | 9/2015 | Yamada | B41J 2/17506 |
| 2006/0268076 A1 * | 11/2006 | Kaga | B41J 2/175 347/84 |
| 2007/0081052 A1 | 4/2007 | Lebron et al. | |
| 2009/0260691 A1 | 10/2009 | Herman | |
| 2009/0262150 A1 | 10/2009 | Morita | |
| 2010/0079516 A1 | 4/2010 | Nakazawa | |
| 2011/0181672 A1 | 7/2011 | Wagner | |
| 2011/0279585 A1 | 11/2011 | Mallory | |
| 2014/0022318 A1 | 1/2014 | Cameno et al. | |
| 2015/0270794 A1 * | 9/2015 | Bauer | H02P 1/16 318/430 |
| 2016/0061336 A1 * | 3/2016 | Elvestad | F16K 31/523 251/325 |

FOREIGN PATENT DOCUMENTS

| | | |
|---|---|---|
| CN | 103561957 | 2/2014 |
| EP | 0208408 | 1/1987 |
| WO | WO-200090139771 | 11/2009 |

* cited by examiner

SELECTION VALVES OF FLUID SUPPLY SYSTEMS

BACKGROUND

Generally, a fluid supply system includes a fluid supply cartridge that may be designed to deliver fluid (e.g., an ink) to a printhead. The fluid supply system may use pressurized air to pump the fluid from the fluid supply cartridge to the printhead. Alternatively, some fluid supply systems may include two fluid supply cartridges of the same fluid type (e.g., same ink color) to enable replacement of a fluid supply cartridge without having to interrupt or pause an operation (e.g., printing).

BRIEF DESCRIPTION OF THE DRAWINGS

Examples of the disclosure are now be described in detail with reference to the accompanying drawings, in which.

DETAILED DESCRIPTION

In the following detailed description of the examples of the present subject matter, references are made to the accompanying drawings that form a part hereof, and in which are shown by way of illustration specific in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

Each fluid supply cartridge in a fluid supply system may have their own source of pressurized air. For example, a printer (e.g., an inkjet printer and the like) supporting two fluid supply cartridges may use two sources of pressurized air, such as two air pumping devices. However, such duplication of pressurized air sources may increase cost and/or decrease reliability. To address these issues, an example fluid supply system disclosed herein includes a source of pressurized air that may be shared by multiple fluid supply cartridges (e. g., ink cartridges). The source of pressurized air may be selectively coupled to the fluid supply cartridges via a selection valve. By controlling a position of the selection valve, a selected one of the fluid supply cartridges is coupled to the source of pressurized air and, thus, provides fluid to, for example, a printhead while other fluid supply cartridge remains unpressurized and may be replaced. For example, the selection valve may be a 4-way 2-position valve. The selection valve includes a sleeve that provides interconnections with the source of pressurized air, air inlets of the fluid supply cartridges, and the atmosphere. Further, the selection valve includes a core disposed rotatably inside the sleeve to selectively couple the one of the fluid supply cartridges to the source of pressurized air and the other fluid supply cartridge to the atmosphere for switching the pressurized air between the fluid supply cartridges. This type of selection valve is of low cost and compact size and consumes less power. Further, the selection valve provides feedback on valve operation to check switching between channels or ways is run properly.

While the examples described herein refer, for ease of discussion, to fluid supply systems for a printer, the example disclosed herein may, additionally or alternatively, be used to implement any number and/or type(s) of fluid supply and/or administration system(s). Moreover, while this disclosure refers to fluids, it may be understood that the examples described herein may be used to supply any number and/or type(s) of fluid(s) and/or liquid(s) such as a non-compressible low viscosity liquid, such as an ink. Also, while the example selection valve described herein is designed to work with air, the selection valve can work with any other fluid, as long as components in the selection valve are compatible with the fluid.

Figure 1:
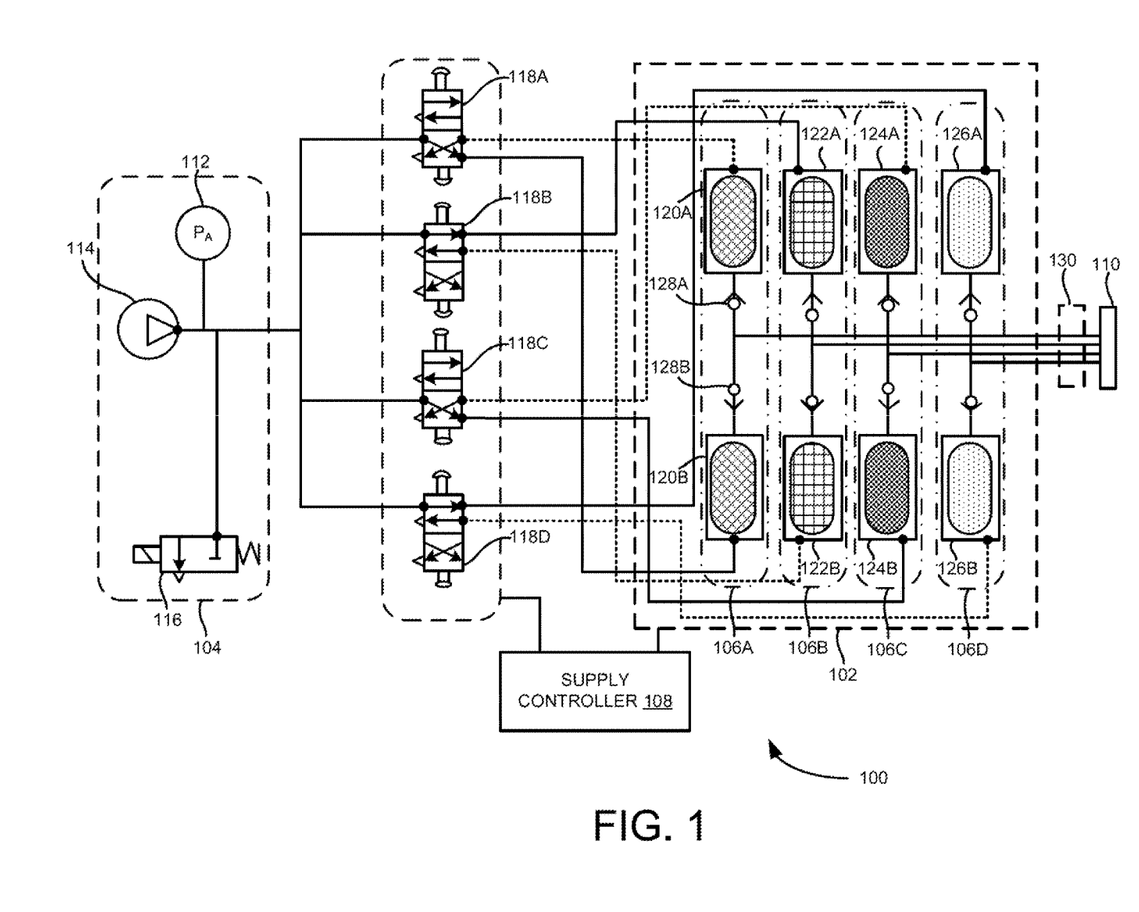
FIG. 1 is a schematic illustration of an example fluid supply system for continuous fluid supply during a printing operation.

FIG. 1 is a schematic illustration of an example fluid supply system 100 for continuous fluid supply during a printing operation. To provide fluid to a printhead 110, the fluid supply system 100 includes a dual cartridge fluid supply station 102 and an air pressurization system 104. Further, the dual cartridge fluid supply station 102 may include fluid supply assemblies 106A-D having two fluid supply cartridges. In the example illustrated in FIG. 1, the fluid supply assembly 106A includes fluid supply cartridges 120A and 120B, the fluid supply assembly 106B includes fluid supply cartridges 122A and 122B, the fluid supply assembly 106C includes fluid supply cartridges 124A and 124B and the fluid supply assembly 106D includes fluid supply cartridges 126A and 126B. In an example, each of the fluid supply assemblies 106A-D may be associated with a different color of fluid. In this example, the fluid supply cartridges 120A and 120B may provide yellow fluid, the fluid supply cartridges 122A and 122B may provide magenta fluid, the fluid supply cartridges 124A and 124B may provide cyan fluid and the fluid supply cartridges 126A and 126B may provide blue fluid. While each of the fluid supply assemblies 106A-D of FIG. 1 supporting two fluid supply cartridges 120A-B, 122A-B, 124A-B and 126A-B, respectively, each of the fluid supply assemblies 106A-D may be implemented to support any other number of fluid supply cartridges (e. g., three).

Furthermore, the fluid supply assemblies 106A-D may include any number and/or type(s) of connectors and/or conductors (not shown) that electrically and/or communicatively couple the fluid supply cartridges 120A-B, 122A-B, 124A-B and 126A-B to a supply controller 108 and/or other devices of a printer. For example, the connectors and/or conductors can be used by the supply controller 108 to obtain fluid level information from the fluid supply cartridges 120A-B, 122A-B, 124A-B and 126A-B and/or to determine which of the fluid supply cartridges 120A-B, 122A-B, 124A-B and 126A-B are currently installed.

In addition, the air pressurization system 104 may include a source of pressurized air 114, a pressure sensor 112 and a pressure relief valve 116. An example source of pressurized air 114 is any type of air pump and/or air pumping device. In an example implementation, the source of pressurized air 114 is controlled using the pressure sensor 112 and the pressure relief valve 116. In the example illustrated in FIG. 1, the source of pressurized air 114 is shared by the fluid supply assemblies 106A-D and the fluid supply cartridges 120A-B, 122A-B, 124A-B and 126A-B within the fluid supply assemblies 106A-D, respectively. Using any number and/or type(s) of method(s) and/or logic(s), the pressure of the air generated and/or provided by the example source of pressurized air 114 may be maintained, adjusted and/or controlled to ensure a consistent and/or adequate flow of fluid from the fluid supply assemblies 106A-D to the printhead 110. When, for example, a printer including the example fluid supply system 100 is powered off and/or to facilitate maintenance, the fluid supply system 100 can be depressurized by opening the pressure relief valve 116.

Moreover, the fluid supply assemblies 106A-D are coupled to the source of pressurized air 114 via respective ways or ports of selection valves 118A-D. In an example, each of the selection valves 118A-D includes four ways or ports for the source of pressurized air 114 (a pressurization port of FIG. 2), air inlets of fluid supply cartridges (S1 and S2 of FIG. 2) and the atmosphere (ATM of FIG. 2). The components or elements of each of the selection valves 118A-D are explained below in more detail with reference to FIG. 3. In the example illustrated in FIG. 1, the fluid supply cartridges 120B, 122A, 124B and 126A are coupled to the source of pressurized air 114 via the selection valves 118A-D, respectively. In this example, the respective one of the selection valves 118A-D selectively couple the source of pressurized air 114 to the fluid supply cartridges 120B, 122A, 124B and 126A to provide fluid to the printhead 110 via fluid pipes 130 and the fluid supply cartridges 120A, 122B, 124A and 126B to the atmosphere in order to be removed or replaced for maintenance or service. In an example implementation, the selection valves 118A-D may selectively couple the fluid supply cartridges 120A-B, 122A-B, 124A-B and 126A-B, respectively, to the source of pressurized air 114 based on fluid level information obtained by the supply controller 108. For example, the source of pressurized air 114 and the selection valves 118A-D of FIG. 1 are selected based on, for example, flow rate(s), pressure(s), pump curve and/or effective relief area requirements.

In an example implementation, when the selection valve 118A couples the fluid supply cartridge 120A to the source of pressurized air 114 (i.e., a first position), the fluid supply cartridge 120A may become pressurized causing the fluid to flow from the fluid supply cartridge 120A to the printhead 110. In this first position (a first position 202 shown in FIG. 2), the fluid supply cartridge 120B is fluidly disconnected from the source of pressurized air 114 (i.e., vented to the atmosphere) and, thus, remains depressurized or unpressurized in order to be removed or replaced for maintenance or service. When the selection valve 118A is in a second position (a second position 204 shown in FIG. 2) where the fluid supply cartridge 120B is fluidly coupled to the source of pressurized air 114, the fluid supply cartridge 120B is pressurized causing fluid to flow from the fluid supply cartridge 120B to the printhead 110. In this second position, the fluid supply cartridge 120A is fluidly disconnected from the source of pressurized air 114 (i.e., vented to the atmosphere) and, thus, remains depressurized. Accordingly, one of the fluid supply cartridges 120A and 120B is pressurized at a time.

Even though the depressurization of one of the fluid supply cartridges 120A and 120B happens while the other fluid supply cartridge 120A and 120B is being pressurized causing the pressure curves of the fluid supply cartridges 120A and 120B to cross at a point Of low pressure, such a cross-over does not represent a condition where more than one of the fluid supply cartridges 120A and 120B is pressurized to a pressure sufficient to cause the fluid to flow. The example selection. valve 118A of FIG. 1 is mechanically stable in the first position and the second position. As the selection valve 118A is moved from the first position to the second position, both of the fluid supply cartridges 120A and 120B may momentarily be connected to the source of pressurized air 114 causing a momentary increase in system air volume. As such, the fluid supply cartridge 120B experiences a quick pressure increase to a pressure that can be estimated as percentage (e.g., $(n-1)/n \times 100\%$, where n is the number of fluid colors in the printer) of the pressure after the swap. Beyond this point, the rate of pressure growth decreases until the pressure reaches the same pressure as the pressurized air.

Also, to prevent the fluid from flowing between the fluid supply cartridges 120A and 120B, the fluid supply system 100 may include check valves 128A and 128B. When the example selection valve 118A is positioned to pressurize the fluid supply cartridge 120A, the respective check valve 128A may be opened to allow the fluid to flow from the fluid supply cartridge 120A to the printhead 110 via the fluid pipes 130, When the selection valve 118A is positioned to not pressurize the fluid supply cartridge 120B, the respective check valve 128B may be closed preventing the fluid from flowing into the fluid supply cartridge 120B, thereby, allowing the fluid supply cartridge 120B to be removed or replaced for maintenance or service and/or to prevent the fluid supply cartridge 120B from being unintentionally filled from another fluid supply cartridge 120A. The example check valves 128A and 128B may also ensure that the fluid supply cartridge 120A and 120B having greater fluid pressure is the fluid supply cartridge 120A and 120B supplying fluid to the printhead 110. The crack pressure of the example check valves 128A and 128B and/or the prevention of internal leaks may affect the method(s) used to determine when to switch between the fluid supply cartridges 120A and 120B and/or operational limits.

In an example, the fluid supply system 100 may include interfaces, controllers, elements and/or devices instead of, or in addition to, those illustrated in FIG. 1 and/or may include more than one of any or all of the illustrated interfaces, controllers, elements and/or devices. Further, the example supply controller 108 may be implemented by one or more circuit(s), programmable processor(s), fuses, application-specific integrated circuit(s) (ASIC(s)), programmable logic device(s) (PLD(s)), field programmable logic device(s) (FPLD(s)), and/or field-programmable gate array(s) (FPGA(s)), and the like.

Figure 2:
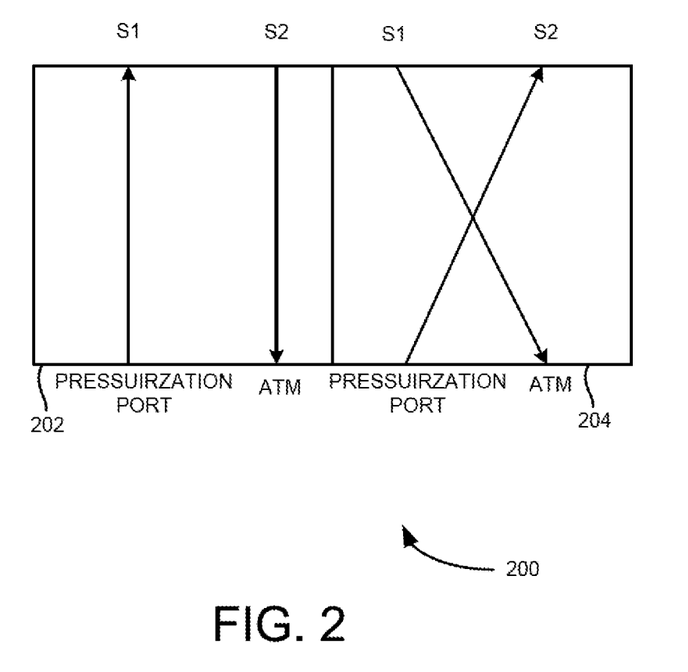
FIG. 2 is a sketch of working schematics of an example selection valve in the fluid supply system, such as shown in FIG. 1.

Referring now to FIG. 2, which is a sketch of working schematics 200 of an example selection valve in a fluid supply system (e.g., any of the selection valves 118A-D in the fluid supply system 100 shown in FIG. 1). As shown in FIG. 2, S1 and S2 are ports to be connected or coupled with air inlets of fluid supply cartridges (e.g., the fluid supply cartridges 120A-B, 122A-B, 124A-B or 126A-B shown in FIG. 1). Further, a pressurization port is a connection port with an air pressurization system (e.g., the air pressurization system 104 shown in FIG. 1) of a printer. Furthermore, ATM is a connection port with the atmosphere. If the selection valve configuration is as depicted in a left frame (i.e., a first position 202), then the S1 is connected to the air pressurization system and the S2 is connected to the atmosphere. In other words, in the first position 202, the S1 is pressurized and the S2 is depressurized or unpressurized. If the selection valve switches to other position (i.e., a second position 204), then the S2 is connected to the air pressurization system and the S1 is connected to the atmosphere. The S1, if previously pressurized, may relief the pressure through the selection valve.

Figure 3:
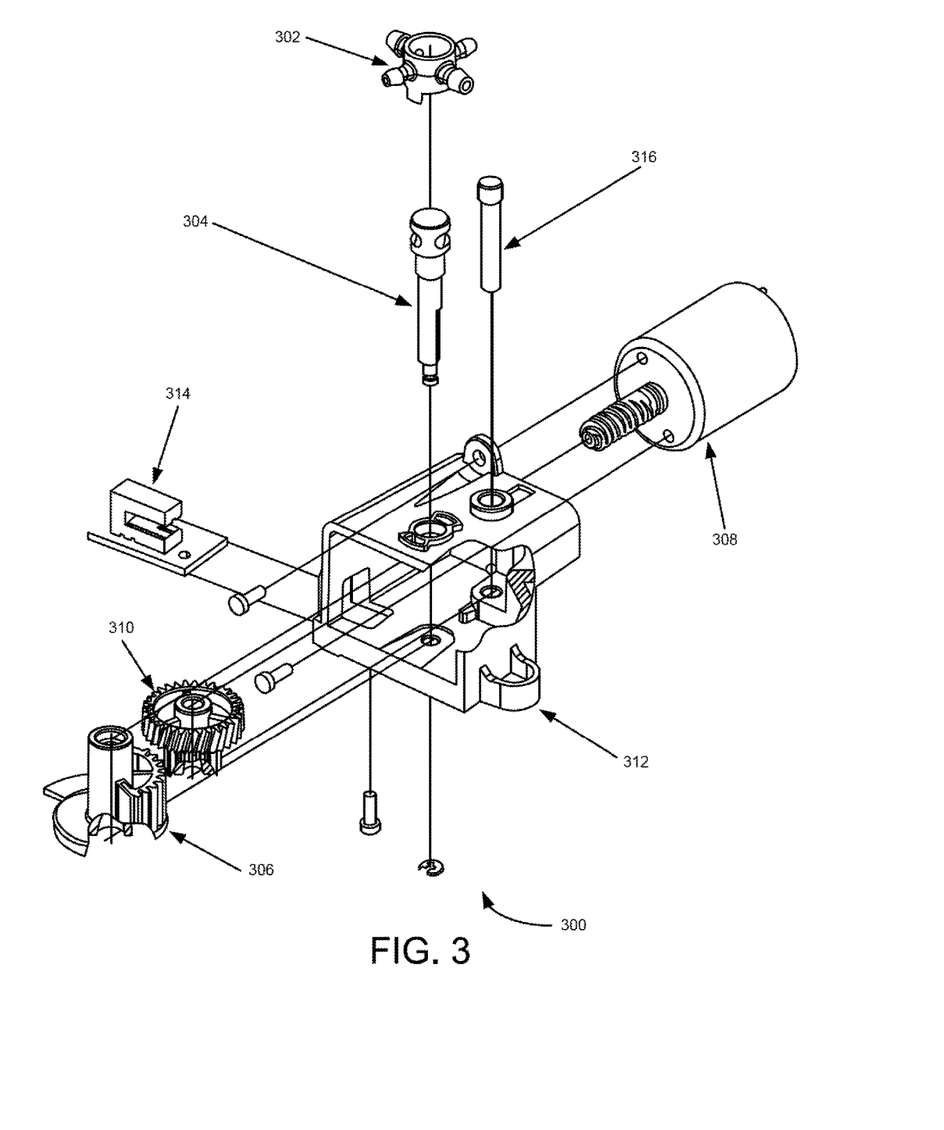
FIG. 3 is a schematic illustration of an example selection valve in the fluid supply system, such as shown in FIG. 1.

Referring now to FIG. 3, which is a schematic illustration of an example selection valve 300 in a fluid supply system (e.g., any one of the selection valves 118A-D in the fluid supply system 100 shown in FIG. 1). As shown in FIG. 3, the selection valve 300 includes a sleeve 302, a core 304, a flag 306, a power source 308, a cluster gear 310, a housing 312, an optical sensor 314 and a shaft pin 316 for the cluster gear 310. Further as shown in FIG. 3, the flag 306 engages with the core 304 and the cluster gear 310. Also, the cluster gear 310 engages the flag 306 with the power source 308 (e.g., a direct current (DC) motor and the like) equipped with a power transmission system (e.g., a worm and the like). In other words, the flag 306 engages with the power source 308 with an adequate transmission ratio provided by the intermediate cluster gear 310.

As shown in FIG. 3, the housing 312 holds the sleeve 302, the core 304, the flag 306, the power source 308, the cluster gear 310, the optical sensor 314 and the shaft pin 316 for the cluster gear 310. Further, the sleeve 302 provides interconnections with a source of pressurized air (e.g., the source of pressurized air 114 of FIG. 1), air inlets of fluid supply cartridges in a fluid supply assembly (e.g., one of the fluid supply assemblies 106A-D of FIG. 1) to which the selection valve 300 is connected, and the atmosphere. Furthermore, the core 304 disposed rotatably inside the sleeve 302 to selectively couple one of the fluid supply cartridges to the source of pressurized air and other fluid supply cartridge to the atmosphere for switching the pressurized air between the fluid supply cartridges. In other words, movement of the core 304 switches the pressurized air between the fluid supply cartridges. For example, the core 304 is disposed rotatably inside the sleeve 302 such that a sealing to avoid air pressure loss is provided. Moreover, the power source 308 provides friction torque for rotation of the flag 306 which in turn rotate the core 304 inside the sleeve 302. In an example, by use of the flag 306 and the power source 308, power consumption by the selection valve 300 is in transitions (i.e., for a short period of time), while the selection valve 300 remains stable and unpowered in both positions (i.e., the first position 202 and the second position 204 shown in FIG. 2).

Figure 4:
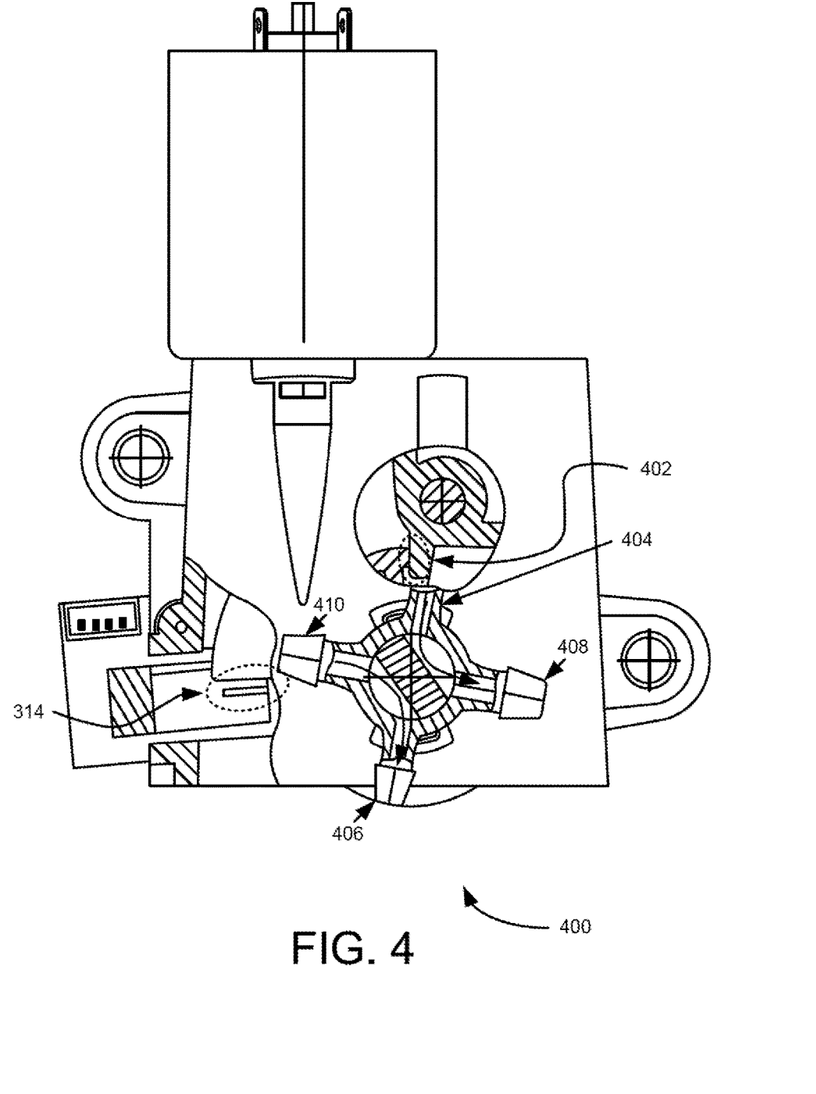
FIGS. 4 and 5 are schematics illustrating detailed designs including internal views of an example selection valve, such as shown in FIG. 3.
Figure 5:
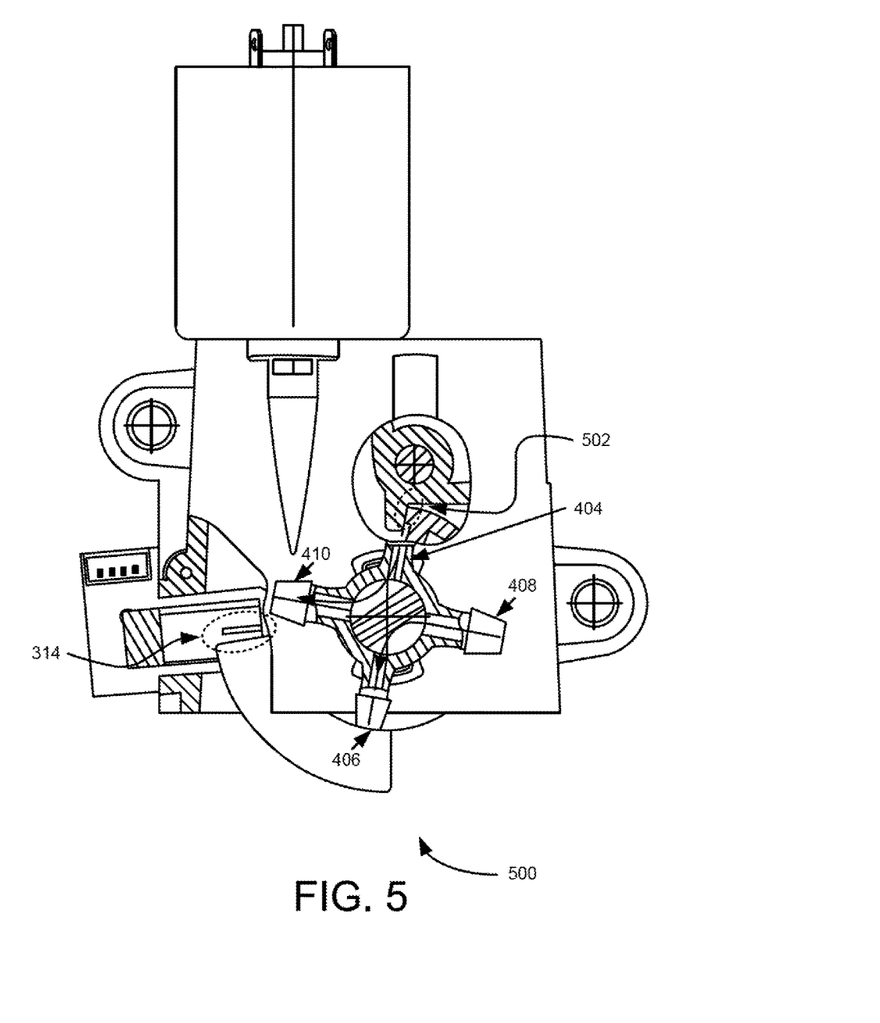

In addition, the optical sensor 314 determines a position of the selection valve 300 based on movement of the core 304 and/or flag 306 for providing feedback on the selection valve 300 operation. The feedback is used to check whether transition between the positions is run properly. For example, the position of the selection valve 300 is a first position where one of the fluid supply cartridges is coupled to the source of pressurized air or a second position where other fluid supply cartridge is coupled to the source of pressurized air. In other words, the optical sensor 314 receives feedback from the core 304 and/or flag 306 movement and is designed to leave an open light path (the optical sensor 314 OFF) when the core 304 is at any of the air inlets of the fluid supply cartridges and a closed light path (the optical sensor 314 ON) when the core 304 is in an intermediate position (not connected to any one of the air inlets of the fluid supply cartridges). In these cases, switch off to the power source 308 is triggered by the flag 306 and the optical sensor 314. Example schematic 400 illustrating a detailed design including an internal view of the selection valve 300 in the first position (e.g., the first position 202 shown in FIG. 2) is shown in FIG. 4. As shown in FIG. 4, S1 408 (e.g., the S1 shown in FIG. 2) is connected to a pressurization port 404 (e.g., the pressurization port shown in FIGS. 2) and S2 410 (e.g., the S2 shown in FIG. 2) is connected to ATM 406 (e.g., the ATM shown in FIG. 2). In this case, the optical sensor 314 reading is OFF and hard stop 402 (materialized in the housing 312) between the flag 306 and the housing 312 prevents a further movement. Example schematic 500 illustrating a detailed design including an internal view of the selection valve 300 in the second position (e.g., the second position 204 shown in FIG. 2) is shown in FIG. 5. As shown in FIG. 5, the S1 408 is connected to the ATM 406 and the S2 410 is connected to the pressurization port 404. In this case, the optical sensor 314 reading is ON and hard stop 502 between the flag 306 and the housing 312 prevents a further movement.

Figure 6:
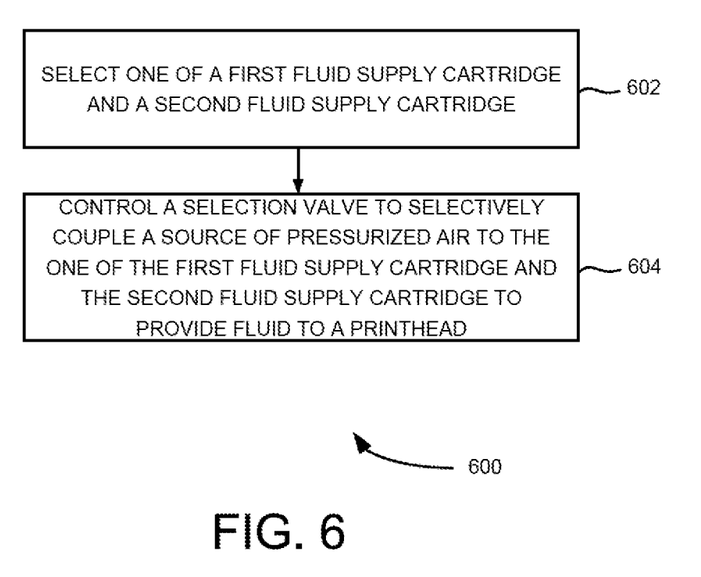
FIG. 6 is a flow chart of an example method for supplying fluid in a fluid supply system.

Referring now to FIG. 6, which is a flow chart 600 of an example method for supplying fluid in a fluid supply system. At block 602, one of a first fluid supply cartridge and a second fluid supply cartridge is selected in the fluid supply system. In an example implementation, the one of the first fluid supply cartridge and the second fluid supply cartridge that is a non-empty fluid supply cartridge is selected in the fluid supply system. In another example implementation, fluid levels for respective ones of the first and second fluid supply cartridges is detected. Further, the one of the first fluid supply cartridge and the second fluid supply cartridge is selected based on the detected fluid levels. For example, the one of the first fluid supply cartridge and the second fluid supply cartridge having high fluid level is selected.

At block 604, a selection valve is controlled to selectively couple a source of pressurized air to the one of the first and second fluid supply cartridges to provide fluid to a printhead, the one of the first and second fluid supply cartridges being coupled to the source of pressurized air at a time and other fluid supply cartridge being vented to the atmosphere. For example, the selection valve may include a sleeve to provide interconnections with the source of pressurized air, the first and second fluid supply cartridges, and the atmosphere. Further, the selection valve may include a core disposed rotatably inside the sleeve to selectively couple the one of the first and second fluid supply cartridges to the source of pressurized air and the other fluid supply cartridge to the atmosphere for switching the pressurized air between the first and second fluid supply cartridges. This is explained above in more detail with reference to FIGS. 1-5.

Figure 7:
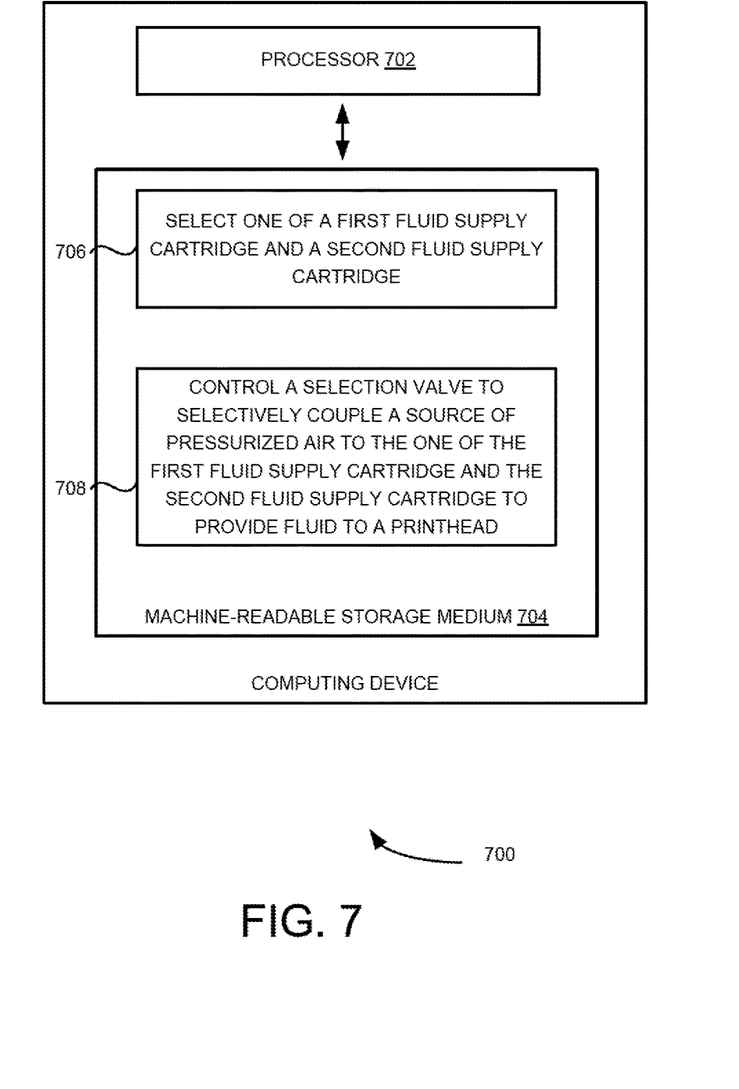
FIG. 7 is a block diagram of an example computing device for supplying fluid in a fluid supply system.

Referring now FIG. 7, which is a block diagram of an example computing device 700 for supplying fluid in a fluid supply system. The computing device 700 includes a processor 702 and a machine-readable storage medium 704 communicatively coupled through a system bus. The processor 702 may be any type of central processing unit (CPU), microprocessor, or processing logic that interprets and executes machine-readable instructions stored in the machine-readable storage medium 704. The machine-readable storage medium 704 may be a random access memory (RAM) or another type of dynamic storage device that may store information and machine-readable instructions that may be executed by the processor 702. For example, the machine-readable storage medium 704 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, the machine-readable storage medium 704 may be a non-transitory machine-readable storage medium. In an example, the machine-readable storage medium 704 may be remote but accessible to the computing device 700.

The machine-readable storage medium 704 may store instructions 706 and 708. In an example, the instructions 706 may be executed by processor 702 to select one of a first fluid supply cartridge and a second fluid supply cartridge in the fluid supply system. Further, the instructions 708 may be executed by processor 702 to control the selection valve to selectively couple a source of pressurized air to the one of the first and second fluid supply cartridges to provide fluid to a printhead, the one of the first and second fluid supply cartridges being coupled to the source of pressurized air at a time and other fluid supply cartridge being vented to the atmosphere. For example, the selection valve may include a sleeve to provide interconnections with the source of pressurized air, the first and second fluid supply cartridges, and the atmosphere. Further, the selection valve may include a core disposed rotatably inside the sleeve to selectively couple the one of the first and second fluid supply cartridges to the source of pressurized air and the other fluid supply cartridge to the atmosphere for switching the pressurized air between the first and second fluid supply cartridges.

For the purpose of simplicity of explanation, the example method of FIG. 6 is shown as executing serially, however it is to be understood and appreciated that the present and other examples are not limited by the illustrated order. The example system of FIG. 1 and method of FIG. 6 may be implemented in the form of a computer program product including computer-executable instructions, such as program code, which may be run on any suitable computing device in conjunction with a suitable OS. Examples within the scope of the present disclosure may also include program products comprising non-transitory computer-readable storage media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present disclosure is for the purpose of illustration. Although the disclosure has been described in conjunction with a specific example thereof, numerous modifications may be possible without materially departing from the teachings and advantages of the subject matter described herein. Other substitutions, modifications and changes may be made without departing from the spirit of the present disclosure. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A selection valve for a fluid supply system, the selection valve is to:
selectively couple a source of pressurized air to one of a first fluid supply cartridge and a second fluid supply cartridge in the fluid supply system to provide fluid to a printhead, one of the first fluid supply cartridge and the second fluid supply cartridge being coupled to the source of pressurized air at a time, and the other fluid supply cartridge being vented to the atmosphere, wherein the selection valve comprises:
a sleeve comprising a first port to connect with the source of pressurized air, a second port to connect with the first fluid supply cartridge, a third port to connect with the second fluid supply cartridge, and a fourth port to connect with the atmosphere;
a core disposed rotatably inside the sleeve,
wherein the core is rotatable to a first position to fluidically connect the second port to the first port to pressurize the first fluid supply cartridge with the pressurized air, and fluidically connect the third port to the fourth port to vent the second fluid supply cartridge to the atmosphere, and
wherein the core is rotatable to a different second position to fluidically connect the third port to the first port to pressurize the second fluid supply cartridge with the pressurized air, and fluidically connect the second port to the fourth port to vent the first fluid supply cartridge to the atmosphere.

2. The selection valve of claim 1, further comprising:
a flag that engages with the core;
a power source; and
a cluster gear to engage the flag with the power source, wherein the power source provides friction torque for rotation of the flag which in turn is to rotate the core inside the sleeve.

3. The selection valve of claim 2, wherein the power source comprises a direct current (DC) motor.

4. The selection valve of claim 2, further comprising:
an optical sensor to determine a position of the selection valve based on movement of at least one of the flag or the core, wherein the position of the selection valve is one of a first position where the first fluid supply cartridge is coupled to the source of pressurized air, and a second position where the second fluid supply cartridge is coupled to the source of pressurized air, and wherein the selection valve is stable and unpowered in both the first and second positions of the selection valve.

5. The selection valve of claim 1, wherein the fluid comprises an ink.

6. A fluid supply system, comprising:
a first fluid supply cartridge and a second fluid supply cartridge;
a source of pressurized air; and
a selection valve to selectively couple the source of pressurized air to one of the first fluid supply cartridge and the second fluid supply cartridge to provide fluid to a fluid dispensing device, the one of the first fluid supply cartridge and the second fluid supply cartridge being coupled to the source of pressurized air at a time, and the other fluid supply cartridge being vented to the atmosphere, wherein the selection valve comprises:
a sleeve comprising a first port to connect with the source of pressurized air, a second port to connect with the first fluid supply cartridge, a third port to connect with the second fluid supply cartridge, and a fourth port to connect with the atmosphere;
a core disposed rotatably inside the sleeve,
wherein the core is rotatable to a first position to fluidically connect the second port to the first port to pressurize the first fluid supply cartridge with the pressurized air, and fluidically connect the third port to the fourth port to vent the second fluid supply cartridge to the atmosphere, and wherein the core is rotatable to a different second position to fluidically connect the third port to the first port to pressurize the second fluid supply cartridge with the pressurized air, and fluidically connect the second port to the fourth port to vent the first fluid supply cartridge to the atmosphere.

7. The fluid supply system of claim 6, wherein the power source comprises a direct current (DC) motor.

8. The fluid supply system of claim 6, wherein the selection valve further comprises:
a flag that engages with the core;
a power source; and
a cluster gear to engage the flag with the power source, wherein the power source provides friction torque for rotation of the flag which in turn rotate the core inside the sleeve.

9. The fluid supply system of claim 6, wherein the source of pressurized air comprises an air pumping device, and wherein the fluid comprises an ink.

10. A fluid supply method, comprising:
selecting one of a first fluid supply cartridge and a second fluid supply cartridge; and
controlling a selection valve to selectively couple a source of pressurized air to the one of the first fluid supply cartridge and the second fluid supply cartridge to provide fluid to a printhead, the one of the first fluid supply cartridge and the second fluid supply cartridge being coupled to the source of pressurized air at a time and the other fluid supply cartridge being vented to the atmosphere, wherein the selection valve comprises:
a sleeve comprising a first port to connect with the source of pressurized air, a second port to connect with the first fluid supply cartridge, a third port to connect with the second fluid supply cartridge, and a fourth port to connect with the atmosphere; and
a core disposed rotatably inside the sleeve,
wherein the core is rotatable to a first position to fluidically connect the second port to the first port to pressurize the first fluid supply cartridge with the pressurized air, and fluidically connect the third port to the fourth port to vent the second fluid supply cartridge to the atmosphere, and
wherein the core is rotatable to a different second position to fluidically connect the third port to the first port to pressurize the second fluid supply cartridge with the pressurized air, and fluidically connect the second port to the fourth port to vent the first fluid supply cartridge to the atmosphere.

11. The fluid supply method of claim 10, wherein selecting the one of the first fluid supply cartridge and the second fluid supply cartridge comprises:
detecting fluid levels for respective ones of the first fluid supply cartridge and the second fluid supply cartridge; and
selecting the one of the first fluid supply cartridge and the second fluid supply cartridge based on the fluid levels.

12. The fluid supply method of claim 10, wherein the fluid comprises an ink.

13. The selection valve of claim 4, wherein the optical sensor is to provide a first indication responsive to the selection valve being at the first position of the selection valve or the second position of the selection valve, and the optical sensor is to provide a second indication responsive to the selection valve being at an intermediate position between the first and second positions of the selection valve, the second indication different from the first indication.

14. The selection valve of claim 13, wherein the power source is to switch off responsive to the first indication from the optical sensor, and the power source is on responsive to the second indication from the optical sensor.

15. The fluid supply system of claim 8, wherein the selection valve further comprises:
an optical sensor to determine a position of the selection valve based on movement of at least one of the flag or the core, wherein the position of the selection valve is one of a first position where the first fluid supply cartridge is coupled to the source of pressurized air, and a second position where the second fluid supply cartridge is coupled to the source of pressurized air, and wherein the selection valve is stable and unpowered in both the first and second positions of the selection valve.

16. The fluid supply system of claim 15, wherein the optical sensor is to provide a first indication responsive to the selection valve being at the first position of the selection valve or the second position of the selection valve, and the optical sensor is to provide a second indication responsive to the selection valve being at an intermediate position between the first and second positions of the selection valve, the second indication different from the first indication.

17. The fluid supply system of claim 16, wherein the power source is to switch off responsive to the first indication from the optical sensor, and the power source is on responsive to the second indication from the optical sensor.

18. The method of claim 10, further comprising:
indicating, by an optical sensor, a position of the selection valve, the indicating comprising:
providing a first indication responsive to the position of the selection valve being at a first position where the first fluid supply cartridge is coupled to the source of pressurized air, or a second position where the second fluid supply cartridge is coupled to the source of pressurized air, wherein the selection valve is stable and unpowered in both the first and second positions of the selection valve, and
providing a second indication responsive to the selection valve being at an intermediate position between the first and second positions of the selection valve, the second indication different from the first indication.

19. The method of claim 18, further comprising:
responsive to the first indication from the optical sensor, switching off a power source that causes rotation of the core; and
responsive to the second indication from the optical sensor, maintaining the power source on.

20. The selection valve of claim 1, further comprising:
an optical sensor to determine a position of the selection valve, wherein the optical sensor is to provide a first indication responsive to the selection valve being at the first position or the second position, and the optical sensor is to provide a second indication responsive to the selection valve being at an intermediate position between the first and second positions, the second indication different from the first indication; and
a power source to rotate the core, the power source to switch off responsive to the first indication from the optical sensor, and the power source to switch on responsive to the second indication from the optical sensor.

* * * * *

UNITED STATES PATENT AND TRADEMARK OFFICE
CERTIFICATE OF CORRECTION

PATENT NO. : 10,272,690 B2
APPLICATION NO. : 15/542431
DATED : April 30, 2019
INVENTOR(S) : Alfonso Cameno Salinas et al.

It is certified that error appears in the above-identified patent and that said Letters Patent is hereby corrected as shown below:

On the Title Page

Item [72], Line 2-3, delete "Sant Vicent de Montalt" and insert -- Sant Vicenc de Montalt --, therefor.

Item [56], page 2, in Column 2, Foreign Patent Documents, Line 3, delete "WO-200090139771" and insert -- WO-20090139771 --, therefor.

Signed and Sealed this
Fifth Day of November, 2019

Andrei Iancu
*Director of the United States Patent and Trademark Office*